(12) United States Patent
Kunihiro et al.

(10) Patent No.: US 12,466,473 B2
(45) Date of Patent: Nov. 11, 2025

(54) STEERING DEVICE

(71) Applicant: TOYOTA JIDOSHA KABUSHIKI KAISHA, Toyota (JP)

(72) Inventors: Yoji Kunihiro, Susono (JP); Takahiro Kojo, Gotemba (JP); Yutaka Aoki, Mishima (JP); Go Inoue, Gotemba (JP); Yushi Shibaike, Susono (JP); Yushi Nagata, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 18/401,826

(22) Filed: Jan. 2, 2024

(65) Prior Publication Data

US 2024/0343300 A1 Oct. 17, 2024

(30) Foreign Application Priority Data

Apr. 17, 2023 (JP) ................................ 2023-067194

(51) Int. Cl.
*B62D 6/00* (2006.01)
*B60W 50/10* (2012.01)

(52) U.S. Cl.
CPC .............. *B62D 6/00* (2013.01); *B60W 50/10* (2013.01)

(58) Field of Classification Search
CPC ........ B62D 6/00; B62D 6/007; B62D 15/025; B62D 1/286; B60W 50/10
See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |
| 11,572,096 | B2* | 2/2023 | Suzuki ............... B62D 15/0265 |
| 2005/0240328 | A1* | 10/2005 | Shirato .................. B62D 1/286 |
| | | | 701/1 |
| 2017/0088167 | A1* | 3/2017 | Fujii ...................... B62D 1/286 |
| 2018/0186406 | A1* | 7/2018 | Itou ....................... B62D 5/0463 |
| 2018/0273087 | A1* | 9/2018 | Schiebahn ............. B62D 1/286 |
| 2019/0118831 | A1* | 4/2019 | Mimura ................ B60W 30/00 |
| 2019/0286127 | A1* | 9/2019 | Watanabe ............ G05D 1/0061 |

(Continued)

FOREIGN PATENT DOCUMENTS

| | | |
|---|---|---|
| JP | 2019-014433 A | 1/2019 |
| JP | 2020-040533 A | 3/2020 |

*Primary Examiner* — Phutthiwat Wongwian
*Assistant Examiner* — Sherman D Manley
(74) *Attorney, Agent, or Firm* — SoraIP, Inc.

(57) ABSTRACT

The steering device is configured to automatically perform a steering operation of a steering wheel. The steering device is configured to determine that the steering operation of the steering wheel has been performed by the driver based on the steering angle of the steering wheel and the target steering angle, at least during a driving mode in which the steering operation of the steering wheel is automatically performed, and when it is determined that the steering operation of the steering wheel has been performed by the driver, change the operation characteristics of the steering wheel so that the steering force required when the driver steers the steering wheel is reduced compared to before the determination.

9 Claims, 5 Drawing Sheets

(56) References Cited

U.S. PATENT DOCUMENTS

| | | | |
|---|---|---|---|
| 2020/0031344 A1* | 1/2020 | Okano | B62D 1/286 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2022/0227412 A1* | 7/2022 | Akatsuka | B62D 6/008 |
| 2022/0227416 A1* | 7/2022 | Suzuki | B62D 15/025 |
| 2024/0174292 A1* | 5/2024 | Feick | B62D 6/008 |
| 2024/0343260 A1* | 10/2024 | Kunihiro | B60W 60/001 |
| 2024/0343302 A1* | 10/2024 | Kunihiro | B62D 1/286 |
| 2025/0100612 A1* | 3/2025 | Oya | B62D 1/286 |

\* cited by examiner

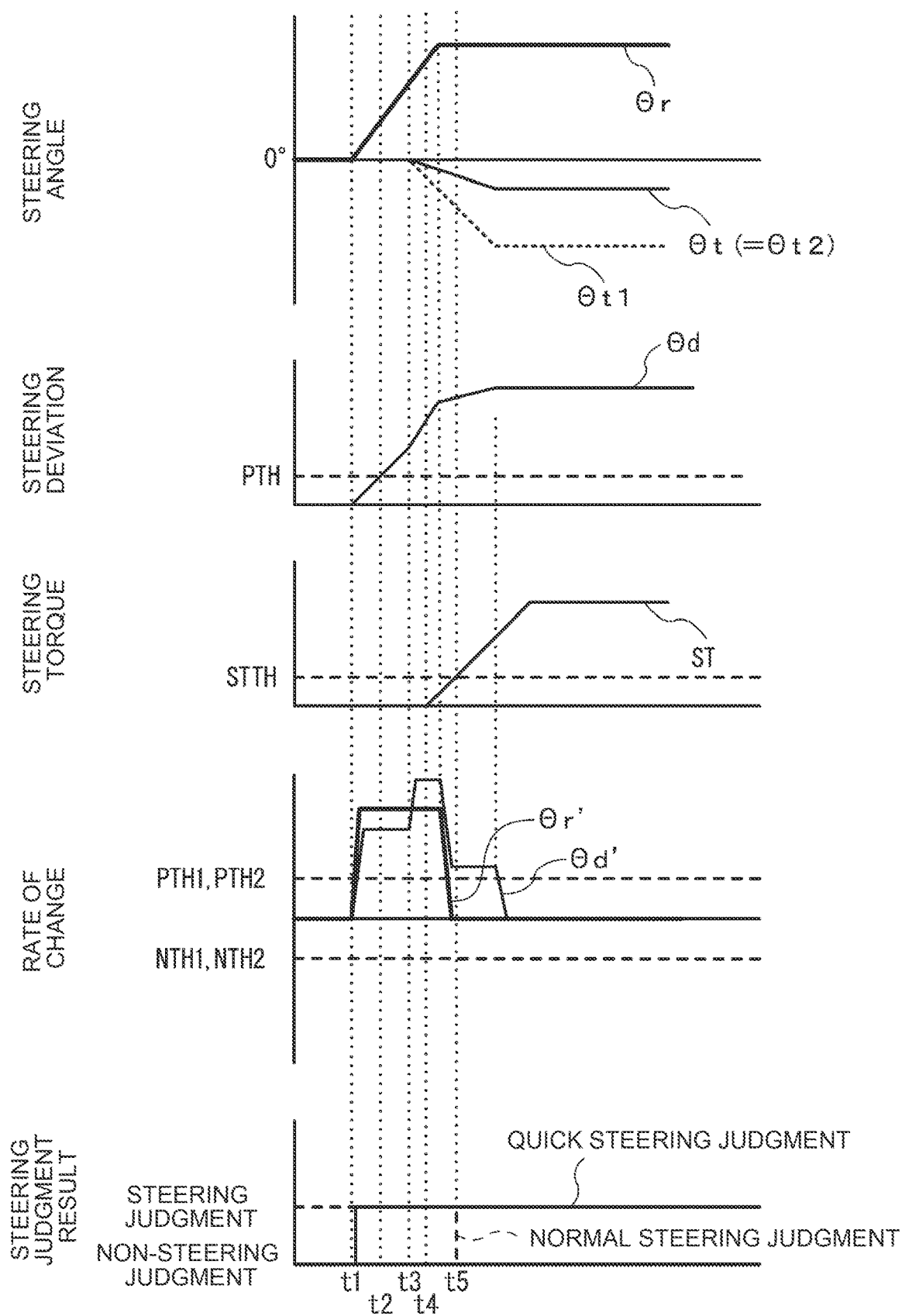

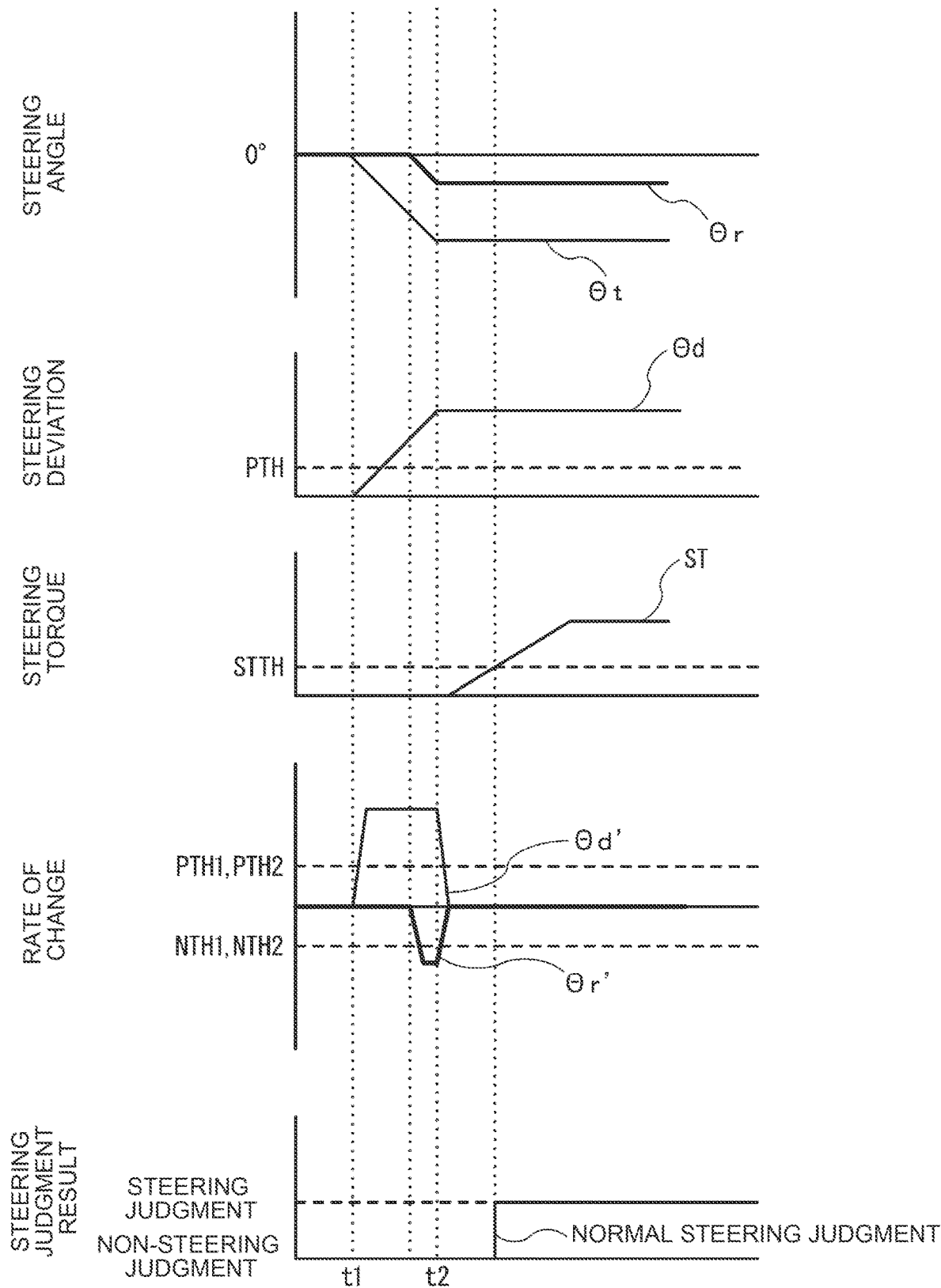

STEERING DEVICE

CROSS-REFERENCE TO RELATED APPLICATION

This application claims priority to Japanese Patent Application No. 2023-067194 filed on Apr. 17, 2023, incorporated herein by reference in its entirety.

BACKGROUND

1. Technical Field

The present disclosure relates to a steering device.

2. Description of Related Art

Japanese Unexamined Patent Application Publication No. 2020-40533 (JP 2020-40533 A) discloses a related-art vehicle travel control system configured to switch the driving mode to a driving mode that requires a driver's steering operation when determination is made that the driver is going to hold a steering wheel during a driving mode that does not require the driver's steering operation.

SUMMARY

During a driving mode that does not require a driver's steering operation, the driver may perform a steering operation on a steering wheel to correct the steering angle. When the vehicle cannot detect early that the driver has performed the steering operation, the vehicle determines that the steering input caused by the driver's steering operation is a disturbance and attempts to cancel the steering input. As a result, the feeling of operation on the steering wheel may be impaired.

The present disclosure has been made in view of such a problem, and an object of the present disclosure is to suppress impairment of the feeling of operation on a steering wheel by detecting a driver's steering operation early.

In order to solve the above problem, a steering device according to an aspect of the present disclosure is configured to automatically perform a steering operation on a steering wheel.

The steering device is configured to:
determine that a driver has performed a steering operation on the steering wheel based on a steering angle and a target steering angle of the steering wheel at least during a driving mode in which the steering operation on the steering wheel is automatically performed; and when determination is made that the driver has performed the steering operation on the steering wheel, change operation characteristics of the steering wheel to reduce a steering force required for the driver to steer the steering wheel compared to the steering force before the determination.

According to the aspect of the present disclosure, determination can be made early about the driver's steering operation based on the steering angle and the target steering angle of the steering wheel, and the operation characteristics of the steering wheel can be changed to reduce the steering force required for the driver to steer the steering wheel compared to the steering force before the determination. Therefore, it is possible to suppress the impairment of the feeling of operation on the steering wheel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a time chart illustrating the effects of the steering control according to the second embodiment of the present disclosure; and FIG. 5 is a time chart when the driver performs a holding operation on the steering wheel to stop the rotation of the steering wheel during the automatic steering driving mode.

DETAILED DESCRIPTION OF EMBODIMENTS

Hereinafter, embodiments of the present disclosure will be described in detail with reference to the drawings. In addition, in the following description, the same reference number is attached to the same component.

First Embodiment

Figure 1:
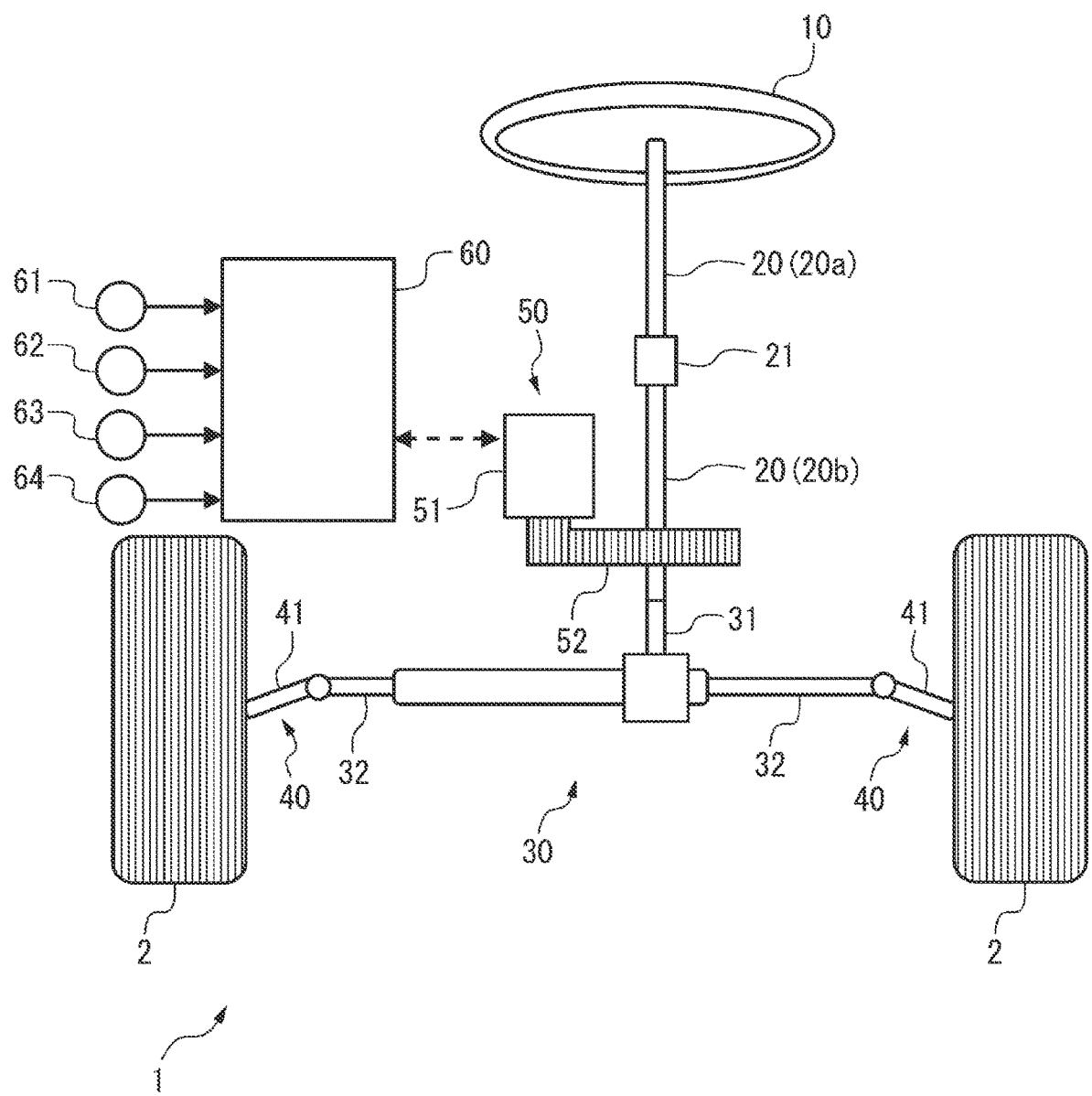
FIG. 1 is a schematic configuration diagram of a steering device according to a first embodiment of the present disclosure.

FIG. 1 is a schematic configuration diagram of a steering device 1 according to a first embodiment of the present disclosure.

A steering device 1 according to the present embodiment is a device for steering left and right wheels (hereinafter referred to as "steered wheels") 2 of a vehicle to change the traveling direction of the vehicle, and includes a steering wheel 10, a steering shaft 20, a rack-and-pinion gear mechanism 30 including a pinion shaft 31 and a rack shaft 32, a link mechanism 40 that connects the gear mechanism 30 and the steered wheels 2, a steering support mechanism 50, and an electronic control unit 60.

The steering wheel 10 is provided in the driver's seat of the vehicle and is operated by the driver of the vehicle. When the driver of the vehicle operates the steering wheel 10 to rotate the steering wheel 10, the steering angle of the steered wheels 2 changes via the steering shaft 20, the gear mechanism 30, and the link mechanism 40. The direction of travel changes.

The steering shaft 20 has one end connected to the steering wheel 10 and rotates together with the steering wheel 10, and the other end connected to a pinion shaft 31 of the gear mechanism 30. The steering shaft 20 is divided into a steering input shaft 20*a* on the steering wheel 10 side and a steering output shaft 20*b* on the gear mechanism 30 side. These shafts are connected by a torsion bar 21 that twists depending on the direction and magnitude of torque (hereinafter referred to as "steering torque") ST that is applied by the steering wheel 10 and acts on the steering shaft 20.

The gear mechanism 30 is configured to convert the rotational motion of the pinion shaft 31 into left and right linear motion along the axial direction of the rack shaft 32. The pinion shaft 31 has one end connected to the steering output shaft 20*b* and rotates together with the steering shaft 20. A pinion gear is formed on the outer peripheral surface of the other end of the pinion shaft 31. The rack shaft 32 extends left and right substantially parallel to the vehicle width direction, and a rack gear that meshes with a pinion gear is formed on a portion of its outer peripheral surface.

Thereby, when the pinion shaft 31 rotates, the rack shaft 32 moves left and right along the axial direction according to the rotation direction.

The link mechanism 40 includes tie rods 41 attached to both ends of the rack shaft 32, knuckle arms (not shown) connected to each tie rod 41 to support each steered wheel 2, and the like. It is configured to be able to transmit lateral linear motion of the rack shaft 32 to the steered wheels 2 and change their direction (steered angle).

The steering support mechanism 50 includes an electric motor 51 and a speed reducer 52 that transmits the output of the electric motor 51 to the steering output shaft 20b. The steering support mechanism 50 generates a motor torque MT using an electric motor 51, and transmits the motor torque MT to the steering output shaft 20b via a speed reducer 52. The steering support mechanism 50 allows the steering force of the steering wheel 10 to be reduced, and also allows the steering operation of the steering wheel 10 to be performed automatically.

The electronic control unit 60 includes a microcontroller having a central processing unit (CPU), memory such as read-only memory (ROM) or random access memory (RAM), input ports, and output ports interconnected by a bidirectional bus. It is a computer. The electronic control unit 60 executes various computer programs stored in the memory, and at least during an automatic steering driving mode in which the steering operation of the steering wheel 10 is automatically performed (for example, during automatic driving or driving support such as lane keeping control) is configured to automatically perform the steering operation of the steering wheel 10.

The electronic control unit 60 includes a steering angle sensor 61 for obtaining the rotation angle (hereinafter referred to as "steering angle") Θr of the steering wheel 10 during a steering operation, and a steering torque sensor 62 for obtaining the steering torque ST, a vehicle speed sensor 63 for acquiring vehicle speed, a surrounding sensor 64 for acquiring peripheral data representing the surrounding situation of the host vehicle, and the like. The surrounding sensor 64 is, for example, one or more external cameras for photographing the surroundings of the own vehicle. In this embodiment, the steering angle Θr when the steering wheel 10 is at the neutral position is 0°. The rotation angle of the steering wheel 10 in the right direction from the neutral position is expressed as a positive value. The rotation angle of the steering wheel 10 in the left direction from the neutral position is expressed as a negative value.

Figure 2:
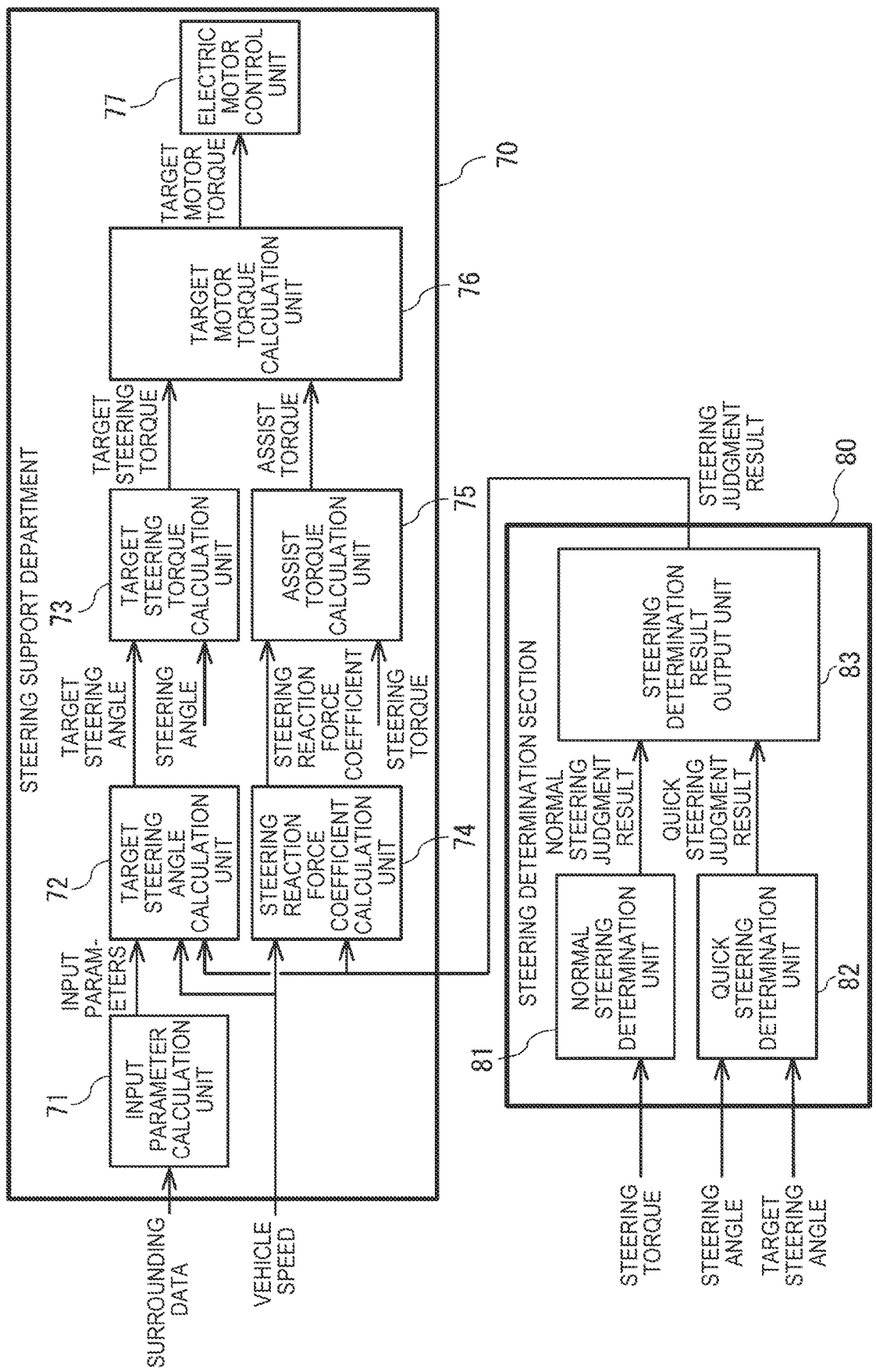
FIG. 2 is a control block diagram illustrating steering control according to the first embodiment of the present disclosure.

The electronic control unit 60 functions as a steering support section 70 and a steering determination unit 80 as shown in FIG. 2 by executing processing according to a computer program, and operates as a functional section (module) that realizes a predetermined function. In the following description, when a process is explained using each functional unit as a subject, it is meant that the electronic control unit executes a program that implements the functional unit. Details of each functional unit 70, 80 will be described later.

During the automatic steering driving mode described above, the driver may perform a steering operation on the steering wheel 10 to correct the steering angle. At this time, if the steering device 1 is unable to detect the driver's steering operation early, the steering device 1 determines that the steering input caused by the driver's steering operation is a disturbance and attempts to cancel the steering input, the operating feeling of the steering wheel 10 may deteriorate. Therefore, when the driver's steering operation is detected during automatic steering driving mode, the driver's steering operation may be stronger than before the steering operation was detected, for example by weakening the force that attempts to cancel the steering input by the driver's steering operation. It is desirable to vary the operating characteristics of the steering wheel 10 so that the steering force required to steer the steering wheel 10 is reduced.

As a steering determination method for determining that a steering operation has been performed by the driver during the automatic steering driving mode, for example, there is a method of detecting whether the steering torque ST generated by the driver's steering operation has exceeded a predetermined threshold value. However, there is a time delay between when the driver performs a steering operation and when the steering torque ST is detected. Therefore, in this method, when the driver quickly turns the steering wheel 10, that is, when the driver performs quick steering (hereinafter referred to as "quick steering"), the steering torque ST is adjusted to a predetermined value after the steering operation is performed. The time it takes to reach the threshold tends to be longer.

Therefore, when the driver performs a quick steering operation, the time required from the steering operation to the steering determination tends to be longer, and as a result, the period during which the operation feeling of the steering wheel 10 deteriorates may become longer.

Therefore, in the present embodiment, even when the driver performs quick steering, it is possible to perform the steering determination at an early stage. The steering control according to this embodiment will be described below with reference to FIG. 2.

FIG. 2 is a control block diagram illustrating the steering control according to the present embodiment, and is a diagram illustrating the contents of the steering support section 70 and the steering determination unit 80 described above.

The steering support section 70 includes an input parameter calculation unit 71, a target steering angle calculation unit 72, a target steering torque calculation unit 73, a steering reaction force coefficient calculation unit 74, an assist torque calculation unit 75, and a target motor torque calculation unit 76 and an electric motor control unit 77.

The input parameter calculation unit 71 acquires surrounding data of the own vehicle obtained by the surrounding sensor 64.

The input parameter calculation unit 71 recognizes the driving lane in which the host vehicle travels based on surrounding data of the host vehicle, and calculates input parameters for target steering angle calculation based on the recognition result. In the present embodiment, the input parameter calculation unit 71 calculates the radius of curvature of the driving lane, the amount of lateral deviation of the center position of the own vehicle from the center line of the driving lane (hereinafter referred to as the "offset amount of the own vehicle"), and the amount of deviation relative to the target driving line. The yaw angle of the host vehicle (rotation angle of the host vehicle around the vertical axis) is calculated as an input parameter for calculating the target steering angle. There is no particular limitation on how to set the target driving line. For example, in this embodiment, the center line of the driving lane is set as the target driving line, but it may be recognized based on surrounding data of the own vehicle. The traveling trajectory of the preceding vehicle may be set as the target traveling line.

The target steering angle calculation unit 72 receives input parameters for calculating the target steering angle and a determination result (hereinafter referred to as "steering determination result") as to whether or not the driver is performing a steering operation, which is output from a steering determination result output unit 83 (described later) and the vehicle speed V detected by the vehicle speed sensor 63 are obtained.

The target steering angle calculation unit 72 first calculates two types of target steering angles (a first target steering angle $\Theta t1$ and a second target steering angle $\Theta t2$) in accordance with the vehicle speed V so that the vehicle travels along the target traveling line, based on the input parameters for calculating the target steering angle. The first target steering angle $\Theta t1$ and the second target steering angle $\Theta t2$ calculated by the target steering angle calculation unit 72 are determined by the absolute value of the first target steering angle $\Theta t1$ when the traveling line of the own vehicle deviates from the target traveling line. is larger than the absolute value of the second target steering angle $\Theta t2$.

The target steering angle calculation unit 72 then sets the first target steering angle $\Theta t1$ or the second target steering angle $\Theta t2$ as the target steering angle $\Theta t$ based on the steering determination result. Specifically, if the steering determination result is a "non-steering determination" that the driver is not performing a steering operation, the target steering angle calculation unit 72 sets the first target steering angle $\Theta t1$ as the target steering angle $\Theta t$. On the other hand, if the steering determination result is a "steering determination" that the driver is performing a steering operation, the target steering angle calculation unit 72 sets the second target steering angle $\Theta t2$ as the target steering angle $\Theta t$.

The target steering torque calculation unit 73 acquires the steering angle $\Theta r$ detected by the steering angle sensor 61 and the target steering angle $\Theta t$. The target steering torque calculation unit 73 calculates a target steering torque STt for causing the steering angle $\Theta r$ to follow the target steering angle $\Theta t$ with desired responsiveness based on the steering angle $\Theta r$ and the target steering angle $\Theta t$.

The steering reaction force coefficient calculation unit 74 acquires the vehicle speed V detected by the vehicle speed sensor 63 and the steering determination result.

The steering reaction force coefficient calculation unit 74 first calculates two types of steering reaction force coefficients (a first steering reaction force coefficient $\alpha 1$ and a second steering reaction force coefficient $\alpha 2$) according to the vehicle speed V. The first steering reaction force coefficient $\alpha 1$ is set to a smaller value than the second steering reaction force coefficient $\alpha 2$.

Next, the steering reaction force coefficient calculation unit 74 sets the first steering reaction force coefficient $\alpha 1$ and the second steering reaction force coefficient $\alpha 2$ as the steering reaction force coefficient $\alpha$, based on the steering determination result. Specifically, the steering reaction force coefficient calculation unit 74 sets the first steering reaction force coefficient $\alpha 1$ as the steering reaction force coefficient $\alpha$ when the steering determination result is "non-steering determination". On the other hand, when the steering determination result is "steering determination", the steering reaction force coefficient calculation unit 74 sets the second steering reaction force coefficient $\alpha 2$ as the steering reaction force coefficient $\alpha$.

The assist torque calculation unit 75 obtains the steering torque ST detected by the steering torque sensor 62 and the steering reaction force coefficient $\alpha$. The assist torque calculation unit 75 calculates the product of the steering reaction force torque corresponding to the steering torque ST multiplied by the steering reaction force coefficient $\alpha$ as the assist torque AT.

The target motor torque calculation unit 76 obtains the target steering torque STt and the assist torque AT. The target motor torque calculation unit 76 calculates the target steering torque STt plus the assist torque AT as the target motor torque MTt.

Electric motor control unit 77 obtains target motor torque MTt. The electric motor control unit 77 controls the electric motor 51 so that the torque (motor torque) of the electric motor 51 becomes the target motor torque MTt. As a result, the steering angle $\Theta r$ is automatically changed so that the host vehicle travels along the target travel line.

The steering determination unit 80 includes a normal steering determination unit 81, a quick steering determination unit 82, and a steering determination result output unit 83.

The normal steering determination unit 81 acquires the steering torque ST detected by the steering torque sensor 62. If the steering torque ST is equal to or greater than a predetermined normal determination threshold value STTH, the normal steering determination unit 81 determines that a steering operation is being performed by the driver, and outputs a normal steering determination. In other cases, a non-steering determination is output.

The quick steering determination unit 82 acquires the steering angle $\Theta r$ detected by the steering angle sensor 61 and the target steering angle $\Theta t$ calculated by the target steering torque calculation unit 73.

The quick steering determination unit 82 calculates the deviation (hereinafter referred to as "steering deviation") $\Theta d$ ($=\Theta r-\Theta t$) between the steering angle $\Theta r$ and the target steering angle $\Theta t$, and determines that the driver is performing a steering operation when the steering deviation $\Theta d$ is equal to or larger than a predetermined positive quick steering determination threshold PTH or the steering deviation $\Theta d$ is equal to or less than a predetermined negative quick steering determination threshold NTH, and outputs a quick steering determination. In other cases, a non-steering determination is output. Note that the positive threshold PTH and negative threshold NTH are provided in this manner when the steering wheel 10 is rotated in the right direction from the neutral position, assuming that the steering angle $\Theta r$ is 0° when the steering wheel 10 is in the neutral position. This is because the angle is expressed as a positive value, and the rotation angle of the steering wheel 10 in the left direction from the neutral position is expressed as a negative value.

The steering determination result output unit 83 acquires the determination result of the normal steering determination unit 81 and the determination result of the quick steering determination unit 82.

The steering determination result output unit 83 outputs "steering determination" as the steering determination result if the normal steering determination unit 81 outputs the normal steering determination or if the quick steering determination unit 82 outputs the quick steering determination. On the other hand, if the non-steering determination is output from both the normal steering determination unit 81 and the quick steering determination unit 82, the steering determination result output unit 83 outputs "non-steering determination" as the steering determination result.

As described above, when the travel line of the vehicle deviates from the target travel line, the absolute value of the first target steering angle $\Theta t1$ is larger than the absolute value of the second target steering angle $\Theta t2$. Therefore, in this embodiment, the target steering torque STt is smaller when the steering determination result is a steering determination (when the target steering angle $\Theta t$ is set to the second target steering angle $Θt2$) than when the steering determination result is a non-steering determination (when the target steering angle $Θt$ is set to the first target steering angle $Θt1$). In other words, in this embodiment, when the steering determination result is a steering determination, the force that attempts to cancel the steering input by the driver's steering operation is weaker than when the steering determination result is a non-steering determination.

On the other hand, the first steering reaction force coefficient $α1$ is set to a smaller value than the second steering reaction force coefficient $α2$. Therefore, in this embodiment, the assist torque AT becomes larger when the steering determination result is a steering determination (when the steering reaction force coefficient $α$ is set to the second steering reaction force coefficient $α2$) than when the steering determination result is a non-steering determination (when the steering reaction force coefficient $α$ is set to the first steering reaction force coefficient $α1$). In other words, in this embodiment, the force for assisting the driver's steering is stronger when the steering determination result is a steering determination than when the steering determination result is a non-steering determination.

As described above, in this embodiment, when the driver performs a steering operation during the automatic steering driving mode and the steering determination result switches from a non-steering determination to a steering determination, a force that attempts to cancel the steering input due to the driver's steering operation becomes weaker, and assist torque AT (force that assists the driver in steering) becomes larger. Therefore, in this embodiment, when the steering determination result switches from non-steering determination to steering determination during the automatic steering driving mode, the operation feeling of the steering wheel 10 becomes better than before the switching.

Figure 3:
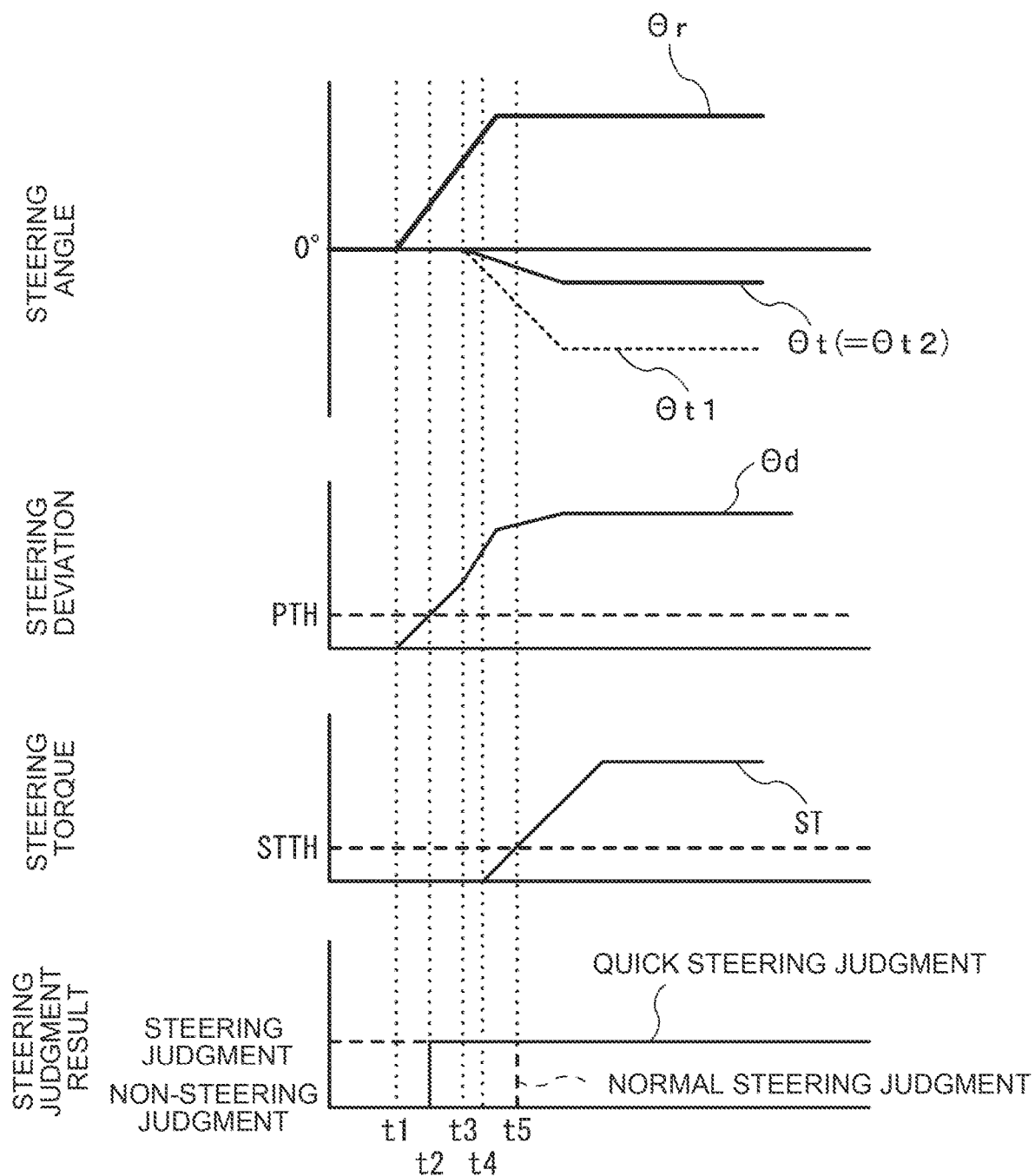
FIG. 3 is a time chart illustrating the effects of the steering control according to the first embodiment of the present disclosure.

FIG. 3 is a time chart illustrating the effects of the steering control according to this embodiment.

As shown in FIG. 3, for example, when the vehicle is traveling straight in the automatic steering driving mode (that is, when the steering angle $Θr$ and the target steering angle $Θt$ are each zero), the driver performs a quick steering operation at time t1. When the steering wheel 10 is quickly rotated clockwise from the neutral position, the steering angle $Θr$ increases in response to the quick steering operation, and the steering torque ST increases at time t4 after the quick steering operation. Therefore, it is at time t5, further delayed from time t4, that the steering torque ST becomes equal to or greater than the normal determination threshold value STTH and the normal steering determination is output.

When the driver performs a quick steering operation, the target steering angle $Θt$ is determined at time t3 after the quick steering operation by the electronic control unit 60, which has determined that the driver's quick steering operation is a disturbance, to change the direction of change of the steering angle $Θr$. However, the steering deviation $Θd$ between the steering angle $Θr$ and the target steering angle $Θt$ increases from time t1 without being delayed by the quick steering operation.

Therefore, according to the present embodiment, the "steering determination" can be output from the steering determination result output unit 83 at time t2 when the steering deviation $Θd$ becomes equal to or greater than the quick steering determination threshold PTH. That is, according to the present embodiment, the operating characteristics of the steering wheel 10 in the automatic steering driving mode can be switched at time t2, which is earlier than time t5 at which the steering torque ST becomes equal to or higher than the normal determination threshold value STTH. Since the second target steering angle $Θt2$ can be set to the target steering angle $Θt$ after t3, deterioration of the operation feeling of the steering wheel 10 can be suppressed.

The steering device 1 according to the present embodiment described above is configured to be able to automatically perform the steering operation of the steering wheel 10, and is configured to be able to perform at least the steering operation of the steering wheel 10 automatically during an automatic steering driving mode, it is determined that the steering operation of the steering wheel 10 was performed by the driver based on the steering angle $Θr$ of the steering wheel 10 and the target steering angle $Θt$, and it is determined that the steering operation of the steering wheel 10 was performed by the driver. In this case, the operating characteristics of the steering wheel 10 are changed so that the steering force necessary for the driver to steer the steering wheel 10 is reduced compared to before the determination.

More specifically, the steering device 1 is configured to determine whether the steering operation of the steering wheel 10 has been performed by the driver based on the steering deviation $Θd$ between the steering angle $Θr$ and the target steering angle $Θt$. In this way, by making a steering determination based on the steering deviation $Θd$, it is possible to detect whether or not the driver has performed a steering operation earlier than by making a steering determination based on the steering torque ST, and to control the operation of the steering wheel 10. Since the characteristics can be changed, deterioration of the operating feeling of the steering wheel 10 can be suppressed.

Second Embodiment

Next, a second embodiment of the present disclosure will be described. This embodiment differs from the first embodiment in the content of the quick steering determination unit 82. The differences will be mainly explained below. Also in this embodiment, the quick steering determination unit 82 calculates the steering angle $Θr$ detected by the steering angle sensor 61 and the target steering angle $Θt$ calculated by the target steering torque calculation unit 73, as in the first embodiment. The steering deviation $Θd$ ($=Θr-Θt$) is calculated.

In the present embodiment, the quick steering determination unit 82 further calculates the rate of change of the steering deviation $Θd$ (hereinafter referred to as "deviation speed") $Θd'$ and the rate of change of the steering angle $Θr$ (hereinafter referred to as "steering speed") $Θr'$. Then, the quick steering determination unit 82 determines that the deviation speed $Θd'$ is greater than or equal to a predetermined first positive quick steering determination threshold PTH1, and the steering speed $Θr'$ is greater than or equal to a predetermined second positive quick steering determination threshold PTH2. Or, if the deviation speed $Θd'$ is less than or equal to a predetermined first negative quick steering determination threshold NTH1, and the steering speed $Θr'$ is less than or equal to a predetermined second negative quick steering determination threshold NTH2, the steering by the driver is It determines that the operation is being performed and outputs a quick steering determination. In other cases, a non-steering determination is output.

FIG. 4 is a time chart illustrating the effects of the steering control according to this embodiment.

Similarly to the first embodiment, when the driver performs a quick steering operation at time t1 and quickly rotates the steering wheel 10 clockwise from the neutral position, the steering angle Θr increases in accordance with the quick steering operation, After the quick steering operation, the steering torque ST increases at time t4, and at time t5, the steering torque ST becomes equal to or higher than the normal determination threshold STTH, and a normal steering determination is output.

On the other hand, the deviation speed Θd' and the steering speed Θr' increase from time t1 without being delayed by the quick steering operation, and especially when the quick steering operation is performed, the rate of change thereof becomes faster. Therefore, almost at the same time as the quick steering operation, the deviation speed Θd' becomes equal to or higher than the first quick steering determination threshold PTH1, and the steering speed Θr' becomes equal to or higher than the second quick steering determination threshold PTH2. The "steering determination" can be output from the steering determination result output unit 83 at an earlier stage than that in the first embodiment. Note that the values of the first quick steering determination threshold PTH1 and the second quick steering determination threshold PTH2 may be the same value or may be different values. The same applies to the first negative quick steering determination threshold NTH1 and the second negative quick steering determination threshold NTH2.

Further, as in the present embodiment, quick steering is performed only when both the deviation speed Θd' and the steering speed Θr' become equal to or greater than the positive thresholds PTH1, PTH2, or equal to or less than the negative thresholds NTH1, NTH2. By making this determination, when the driver performs a holding operation (steering holding operation) on the steering wheel 10 during the automatic steering driving mode, it is possible to suppress the holding operation (steering holding operation) from being mistakenly determined as a steering operation.

FIG. 5 shows that the target steering angle Θt is changed from time t1 as the target travel line is changed during the automatic steering driving mode, and the steering wheel 10 is steered so that the steering angle Θr follows the target steering angle Θt. This is a time chart when the driver performs a holding operation on the steering wheel 10 at time t2 to stop the rotation of the steering wheel 10 while the operation is being performed automatically.

When the driver performs a steering operation on the steering wheel 10, as described above with reference to FIG. 3, the direction of change of the steering angle Θr and the direction of change of the target steering angle Θt are opposite to each other. On the other hand, when the driver performs a holding operation on the steering wheel 10, as shown in FIG. 5, the direction of change of the steering angle Θr and the direction of change of the target steering angle Θt are the same direction.

At this time, if it is determined that the driver is performing a steering operation when the steering deviation Θd is greater than or equal to the positive threshold PTH or less than or equal to the negative threshold NTH as in the first embodiment, the retention It will be determined that a steering operation has been performed even though the operation has been performed.

On the other hand, when a holding operation is performed, as shown in FIG. 5, the direction of change in the deviation speed Θd' and the direction of change in the steering speed Θr' become opposite. Therefore, fast steering is determined only when both the deviation speed Θd' and the steering speed Θr' are equal to or higher than the positive thresholds PTH1, PTH2, or are equal to or lower than the negative thresholds NTH1, NTH2. In this way, it is possible to suppress a steering operation by the driver from being erroneously determined to be a steering operation.

Although the embodiments of the present disclosure have been described above, the above embodiments merely show a part of the application examples of the present disclosure, and are not intended to limit the technical scope of the present disclosure to the specific configurations of the above embodiments.

For example, in each of the embodiments described above, the quick steering determination unit 82 outputs the quick steering determination result based on the steering angle Θr and the target steering angle Θt, and in the first embodiment, the quick steering determination unit 82 outputs the quick steering determination result using the steering deviation Θd calculated based on the steering angle Θr and the target steering angle Θt. In the second embodiment, a quick steering determination result is output using the deviation speed Θd', which is the speed of change of the steering deviation Θd, and the speed of change of the steering speed Θr' of the steering angle Θr.

However, the present disclosure is not limited to this, and the quick steering determination result may be output using the steering angle Θr and the steering deviation Θd, for example. Specifically, the steering angle Θr is greater than or equal to a predetermined first positive quick steering determination threshold PTH1, and the steering deviation Θd is greater than or equal to a predetermined second positive quick steering determination threshold PTH2, or the steering angle If Θr is less than or equal to a predetermined first negative quick steering determination threshold NTH1 and the steering deviation Θd is less than or equal to a predetermined second negative quick steering determination threshold NTH2, a quick steering determination is output; otherwise, may output a non-steering determination.

Further, for example, the quick steering determination result may be output using the deviation speed Θd'. Specifically, if the deviation speed Θd' is greater than or equal to a predetermined positive quick steering determination threshold PTH, or if the deviation speed Θd' is less than or equal to a predetermined negative quick steering determination threshold NTH, a quick steering determination is output, in other cases, a non-steering determination may be output.

Furthermore, in each of the above embodiments, the quick steering determination unit 82 outputs the quick steering determination result based on the steering angle Θr and the target steering angle Θt, but for example, the steering angle Θr and the target steering angle Θt are It is also possible to replace it with a correlated parameter. As a parameter correlated with the steering angle Θr, for example, an offset amount of the host vehicle (amount of lateral shift of the center position of the host vehicle from the center line of the driving lane) can be mentioned. An example of a parameter that has a correlation with the target steering angle Θt is the target offset amount of the own vehicle (the amount of lateral deviation between the center line of the driving lane and the target driving line). This is because if the steering angle Θr is controlled to become the target steering angle Θt, the offset amount of the vehicle will be controlled to become the target offset amount.

Further, in each of the above embodiments, when the "steering determination" is output from the steering determination result output unit 83, in order to reflect the driver's operation in the vehicle behavior, in addition to reducing the steering force, for example, Various driving support functions may be reduced so that functions such as Vehicle Lateral Offset (VLO), which automatically adjusts the distance between the vehicle and other vehicles, automatic lane change, and emergency braking do not operate. Furthermore, in order to notify the driver that the "steering determination" has been made, a so-called "hands-on" display may be displayed, for example, on a display placed in a position visible to the driver.

Furthermore, in each of the above embodiments, the computer program executed by the electronic control unit 60 may be provided in a form recorded in a computer-readable portable recording medium such as a semiconductor memory, a magnetic recording medium, or an optical recording medium.

What is claimed is:

1. A steering device configured to automatically perform a steering operation on a steering wheel of a vehicle, the steering device comprising
    a steering support mechanism mounted on a steering shaft connected to the steering wheel, wherein the steering support mechanism includes an electric motor and a speed reducer that transmits output of the electric motor to the steering shaft, and
    an electronic control unit including a processor configured to:
        calculate a steering deviation between a steering angle of the steering wheel and a target steering angle during a driving mode in which the steering operation on the steering wheel is automatically performed, the target steering angle being obtained based on information about surrounding environment of the vehicle;
        determine whether the steering deviation is equal to or greater than a predetermined first positive threshold or whether the steering deviation is equal to or less than a predetermined first negative threshold;
        determine that a driver of the vehicle has performed the steering operation on the steering wheel in a case where the calculated steering deviation is equal to or greater than the predetermined first positive threshold or in a case where the steering deviation is equal to or less than the predetermined first negative threshold;
        determine that the driver has not performed the steering operation on the steering wheel in a case where the calculated steering deviation is less than the predetermined first positive threshold or in a case where the steering deviation is greater than the predetermined first negative threshold;
        calculate a target steering torque based on the steering angle and the target steering angle, wherein the processor
            sets the target steering angle to a first angle in response to determining that the driver has not performed the steering operation, and
            sets the target steering angle to a second angle in response to determining that the driver has performed the steering operation, an absolute value of the second angle being less than an absolute value of the first angle;
        calculate a target motor torque based on the calculated target steering torque; and
        control the electric motor to output the calculated target motor torque.

2. The steering device according to claim 1, wherein the processor is further configured to;
    calculate a change rate of the steering angle and a change rate of the steering deviation;
    determine that the driver has performed the steering operation on the steering wheel based on the calculated change rate of the steering angle and the calculated change rate of the steering deviation.

3. The steering device according to claim 2, wherein the processor is further configured to determine that the driver has performed the steering operation on the steering wheel in a case where the change rate of the steering deviation is equal to or larger than a predetermined second positive threshold and the change rate of the steering angle is equal to or larger than a predetermined third positive threshold or when the change rate of the steering deviation is equal to or smaller than a predetermined second negative threshold and the change rate of the steering angle is equal to or smaller than a predetermined third negative threshold.

4. The steering device according to claim 1, further comprising:
    a steering angle sensor configured to detect the steering angle of the steering wheel; and
    a steering torque sensor configured to detect a steering torque that is applied to the steering shaft.

5. The steering device according to claim 4, wherein the processor is further configured to:
    calculate an assist torque by multiplying a steering reaction force torque corresponding to the steering torque by a first coefficient in response to determining that the driver has not performed the steering operation, or calculate the assist torque by multiplying the steering reaction force torque corresponding to the steering torque by a second coefficient in response to determining that the driver has performed the steering operation, the second coefficient being greater than the first coefficient, and the assist torque being a force that assists the driver in executing the steering operation;
    calculate the target motor torque by adding the assist torque to the target steering torque; and
    control the electric motor to output the calculated target motor torque.

6. The steering device according to claim 1, further comprising
    a camera disposed on the vehicle and configured to acquire the information about the surrounding environment of the vehicle.

7. The steering device according to claim 1, wherein the processor is further configured to calculate the target steering angle based on a radius of curvature of a road lane on which the vehicle is traveling and an amount of lateral deviation of a center position of the vehicle from a center line of the road lane.

8. The steering device according to claim 1, further comprising
    a camera disposed on the vehicle and configured to acquire an image of the surrounding environment of the vehicle as the information about the surrounding environment of the vehicle, wherein
    the processor is further configured to
        acquire the image from the camera, and
        calculate the target steering angle based on a radius of curvature of a road lane on which the vehicle is traveling and an amount of lateral deviation of a center position of the vehicle from a center line of the road lane based on the acquired image.

9. The steering device according to claim 5, wherein the processor is further configured to
    calculate the assist torque based on the steering reaction force torque and a steering reaction force coefficient, wherein the processor sets the steering reaction force coefficient to the first coefficient in response to determining that the driver has not performed the steering operation, and sets the steering reaction force coefficient to the second coefficient in response to determining that the driver has performed the steering operation.

\* \* \* \* \*